Dec. 9, 1952         R. S. JAMES         2,620,982
COUNT PREDETERMINATOR FOR AUTOMATIC GAS CONTROLS
Filed Nov. 14, 1950
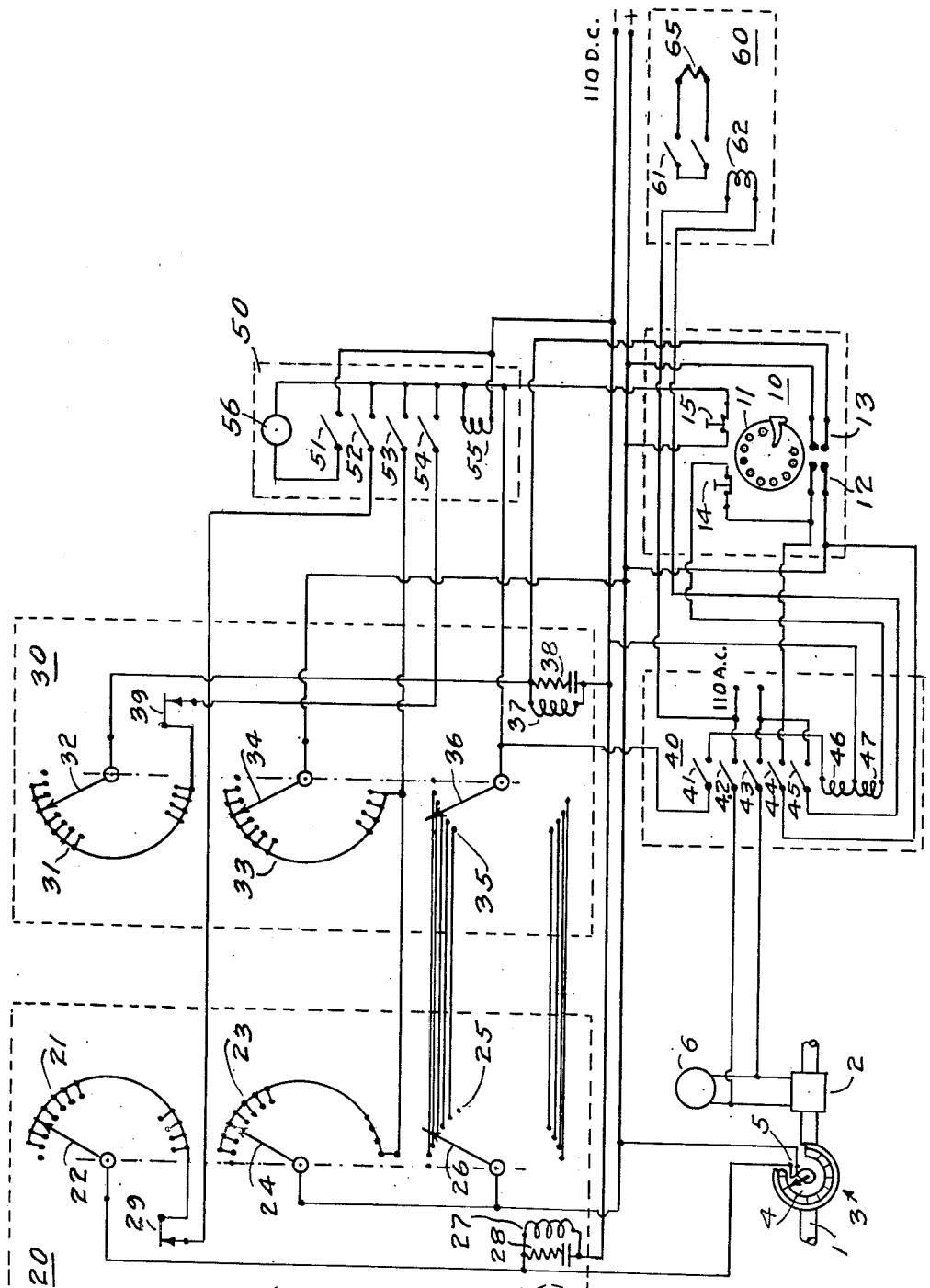
INVENTOR
ROBERT S. JAMES
BY
H. L. Godfrey
ATTORNEY Patented Dec. 9, 1952

2,620,982

UNITED STATES PATENT OFFICE 2,620,982

COUNT PREDETERMINATOR FOR AUTOMATIC GAS CONTROLS

Robert S. James, Pittsburgh, Pa.

Application November 14, 1950, Serial No. 195,688

2 Claims. (Cl. 235—132)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates generally to automatic gas control of gas, and more specifically to a system for allowing the flow of only a selectively variable predetermined amount of gas.

The invention disclosed herein will be found adaptable to any use where a predetermined amount of gas is to be permitted to flow through a valve. However, this invention has been found particularly advantageous in providing a gassy atmosphere in which to test equipment such as motors, controllers, resistors, etc., before being applied to mining equipment bearing Government approval. In such tests the equipment is operated in a predetermined manner in the gallery containing a specified explosive atmosphere. This atmosphere is provided by introducing a precalculated amount of gas.

To introduce gas into the test gallery, a valve is opened to allow ingress of the gas through a meter. Before this invention, unless a cumulative counter equipment was incorporated in the meter, a book record had to be kept of meter revolutions to ascertain the total gas introduced into the gallery. Not only was personnel continuously used for a long period of time to tally the meter revolutions, but the method was open to the error of neglecting to tally all revolutions. In this prior method it was also possible that the watching personnel might neglect to close the valve when the proper amount of gas has been provided, thus necessitating the complete cleaning of the gassy atmosphere from the gallery and another period of entering the correct amount of gas.

This invention provides a system which may be preset to pass the proper amount of gas. The device herein disclosed will open the valve, tally the meter revolutions of a meter not equipped with the cumulative counter, and automatically close the valve at the proper time. The device operates without attention from the time it is preset to the predetermined amount of gas.

It is an object of this invention to provide a system which may be preset to allow the passage of a predetermined amount of gas. It is a further object of this invention to provide a system which may be readily preset to pass any selected predetermined amount of gas. These and other objects will become apparent to those skilled in the art from the following specification when considered along with the accompanying drawing wherein—

The single figure shows a schematic diagram of a system embodying this invention.

As seen in the drawing, pipe 1 conducts gas from a source, not shown, at the right through an electrically operated valve 2 and a gas meter 3 to a gallery, not shown, at the left.

A control box 10 contains a dial 11 similar to the dial used on the handsets of automatic telephones. The dial 11, when it is manually rotated, closes the sets of contacts 12 and 13, respectively, once for each finger position through which the dial is rotated. Control box 10 also contains a stop button 14, normally closed, and a reset button 15, normally open.

There are also provided two rotary switches 20 and 30. Counting rotary switch 20 has on one shaft three rotary contactor arms 22, 24 and 26. The rotary contactor arms 22, 24 and 26 operate on three stationary banks of contacts 21, 23 and 25, respectively. Contact banks 21, 23 and 25 each contain the same number of contacts. Fifty contacts have been found to be a satisfactory number. The shaft on which the rotary contacts 22, 24 and 26 are mounted is rotated in steps from one contact to the next through the action of a conventional circular ratchet and claw (not shown), the claw being operated by the magnet coil 27. The resistor-capacitor series connection 28 shunting magnet coil 27 is to suppress sparks at the contacts associated therewith. Homing contact 29 is conventional in this type of rotary switch and is opened each time the magnet 27 is energized.

The preset rotary switch 30 has three rotary contactor arms 32, 34 and 36 mounted on a shaft rotated, as in the case of rotary switch 20, by magnet 37 which is shunted by its spark suppressing circuit 38. Stationary banks of contacts 31, 33 and 35 are swept by rotary contactor arms 32, 34 and 36, respectively. The same number of contacts are used on the stationary contact banks in rotary switch 30 as were used in the corresponding contact banks of rotary switch 20. Contact 39 is a homing contact for rotary switch 30, and is operated by magnet 37 in the manner described for homing switch 29 of rotary switch 20. Rotary switches 20 and 30 may be of identical construction.

There is also provided a 2-coil differential relay 40 which is normally open and has five single pole contacts 41–45. Coil 47 closes relay 40, when energized, while coil 46 opens it, when energized along with coil 47.

Relay 50, which is normally open, has four sets of contacts 51–54. It is closed by energization of coil 55 and is slow to open when the operating potential is removed from coil 55. Relay 50 also includes a pilot light 56.

Closing coil 47 of relay 40 is connected across the direct current voltage source through the stop button 14 and starting contacts 12. Closing coil 47 is also connected across the source of D. C. potential by the locking contact 44 of relay 40, when closed, and the stop button 14. The opening coil 46 of relay 40 is connected across the source of D. C. potential through the contact 41 of relay 40, when closed, and through rotary contact 36 of switch 30 and rotary contact 26 of switch 20 when these rotary contacts are on corresponding interconnected stationary contacts. Contact 45 of relay 40, when closed, connects the operating coil 62 of relay 60 across the alternating current source. Relay 60, when closed, short-circuits a mixing blower field resistance 65. The mixing blower serves to mix the air and gas present in the test gallery.

Dial pulsing contacts 13 are connected between the source of D. C. potential and the stepping magnet coil 37 of the preset switch 30.

Meter 3 has a cam 4 which closes contacts 5 once for each revolution of the meter recording mechanism. Contacts 5 are connected between stepping magnet 27 of counting switch 20 and the source of direct potential.

Each contact, except the zero contact of stationary bank 25 is connected to the corresponding contact of contact bank 35, leaving the zero contacts of banks 25 and 35 unconnected. All of the contacts in stationary bank 23 of switch 20 are connected together except the zero or dead contact. The contacts of bank 33 of switch 30 are similarly connected and are connected to the connected contacts of bank 23 and to contacts 53 of relay 50.

All of the contacts of bank 21 of switch 20 are connected together except the zero or dead contact, and the connected contacts are connected through the homing contacts 29, to one of contacts 52 of relay 50.

All of the contacts of stationary bank 31 of switch 30 except the zero or dead contact are connected together and through homing contacts 39 to one of contacts 54 of relay 50. One terminal of green pilot light 56 is connected through contacts 51 of relay 50 to one terminal of the source of D. C. potential. The other terminal of pilot light 56 is connected to contactor arm 36, and also through reset button 15 to the other terminal of the source of D. C. potential.

The operating coil 55 of relay 50 is connected through contact 53 of relay 50, when closed, and through the connected contacts of both stationary banks of contacts 23 and 33 and rotary contactor arms 24 and 34 across the source of direct potential. One end of coil 55 of relay 50 is connected to one side of the source of direct potential. The other side of said potential is connected to contactor arm 26. Contactor arm 36 is connected to the other end of the coil 55.

In the operation of the device described above the number of units of gas to be admitted to the gallery is first preset into the bank 35 of the rotary switch 30. For instance, if 25 units of gas are to be admitted to the gallery, the operator's finger would be placed into the last, or 10th, recess of the dial. The dial would be rotated to the fullest extent and released. This would step the contactor arm 36 to the 10th contact of the bank 35. When the dial 11 rotates under spring action back to its original position, the contacts 13 are closed once for each step through which the dial rotates. Each time contacts 13 close, magnet 37 is energized by being connected to the source of direct voltage. Each time the coil 27 is energized the contactor arm 36 is stepped ahead to the next succeeding contact. Dial 11 is given one more full rotation which steps contactor arm 36 from the 10th to the 20th contact. Finally, the operator's finger is placed in the 5th recess and the dial, upon release, applies 5 pulses to magnet 37, stepping contactor arm 36 from the 20th to the 25th contact.

When the dial 11 is first released on its initial manipulation, contacts 12 close for the first time, which closing applies voltage from the direct current source through normally closed stop switch 14 across the coil 47 of the relay 40, operating this relay and closing contacts 41 through 45. Contacts 44, on closing, operate to short-circuit the dial contacts 12. This results in applying a continuing operating potential to the closing coil 47 of the relay 40 whether or not the contacts 12 are closed.

When relay 40 closes, contact 45 applies an operating potential from the source of direct voltage to coil 62 of relay 60. This closes the switch 61, shorting the resistor 65 in the field of a motor running the mixing blower in the gallery. This slows the mixing blower down while the gas is being admitted.

Also upon closing of the relay 40, contacts 42 and 43 connect the operating mechanism of the valve 2 to the source of alternating potential which opens the valve 2, admitting gas through pipe 1 into the gallery. Pilot light 6 is also lighted by the closing of contacts 42 and 43 to show that the valve is open.

The closing of contacts 41 through the energizing relay 40 operates to connect the opening coil 46 of the differential relay 40 to contactor arm 36 of the preset switch 30.

As the gas passes through pipe 1 into the gallery it is measured by the meter 3 which through the operation of cam 4 and contacts 5 applies a pulse of voltage from the direct current source, one each revolution to the stepping magnet 27 of the counting switch 20; thus contact arm 26 is stepped along to the next contact once for each revolution of the member 3.

When the meter 3 has made 25 rotations it will have applied 25 pulses to the stepping magnet 27 and have stepped contactor arm 26 to the 25th contact of the contact bank 25. Since corresponding contacts of banks 25 and 35 of switches 20 and 30, respectively, are connected together and since contactor arms 26 and 36 are now both contacting their 25th contact, potential from the direct current source will now be applied through contactor arm 26 of switch 20, contactor arm 36 of switch 30, and contactor 41 of relay 40 to opening coil 46 of the differential relay 40. When direct current is applied to the opening coil 46, the holding power of the coil 47 is neutralized and the relay 40 opens, with the consequent opening of contacts 41—45. When contacts 42 and 43 are opened, the energizing source of alternating potential is removed from the control mechanism of the valve 2 as well as from the pilot light 6. This results in the closing of the valve 2, preventing additional gas from entering the gallery, and extinguishes pilot light 6, showing that gas is no longer flowing. The opening of contacts 41 and 44 removes energizing potential from coils 46 and 47, respectively. The opening of contact 45 opens relay 60 and speeds up the mixing blower to mix the gas and air in the gallery.

When the contactor arm 26 arrives at its 25th contact it also connects through the contactor arm 36 the source of direct current potential to the operating coil 55 of the relay 50, closing contacts 51, 52, 53 and 54 of that relay. Contact 51 lights pilot light 56, showing that the mechanism is operating to reset itself to zero.

When relay 50 operates, a pulse is applied to the stepping magnet 27 from the source of direct potential through contactor arms 24—34, when these arms are not on their zero contacts, through contacts 53 and 52, homing contact 29, contact bank 21 and contactor arm 22. This results in the stepping of the switch 20 to the next contact and the operation of the magnet 27 also results in the opening of homing contact 29. This operation is carried on continuously until the switch 20 steps all the way around to its zero contact. Since the zero contact of bank 21 is not connected through the homing contacts and contacts 52 and 53 to the source of direct current potential, the stepping operation then ceases, leaving contactor arms 22, 24 and 26 of the switch 20 all on their zero contacts.

Similarly, upon the closing of relay 50, stepping magnet 37 is connected to the source of direct potential through contactor arm 32, contact bank 31, homing contact 39, contacts 54 and 53 of the relay 50 and contactor arms 24 and 34 when these contactor arms are not on their zero contacts. As in the operation of switch 20 the contactor arms 32, 34 and 36 of the switch 30 are stepped around to their zero contacts which, not being connected in the homing circuit, cause cessation of the homing operation, leaving the preset switch 30 set at zero and ready for the next operation. Each operation of stepping magnet 38 opens homing contact 39 to deenergize stepping magnet 38 and prepare that magnet for its next stepping operation. Thus, during the homing operation, the homing magnet 39 has a vibrating operation, as does homing contact 29 of switch 20.

It will be noted that the contactor arms 24 and 34 and their respective contact banks 23 and 33 serve to connect the coil 55 to the source of direct potential through the contact 53. Relay 50 thus receives a pulse each time either of the contactor arms 24 and 34 rest on any of their contacts in the respective banks 23 and 33, except the zero contact of these banks. Since relay 50 is slow to open it is kept closed until the homing operation is completed. Alternatively, or additionally, the contactor arms 24 and 34 may make a bridging contact with the banks 23 and 33 and keep coil 55 continuously energized.

The normally closed stop switch 14 in the control box 10 is an emergency stop switch. When this switch is operated it disconnects the direct potential source of energizing potential from the closed coil 47. This allows relay 40 to open and the opening of contacts 42 and 43 operate to close the valve to prevent the entry of additional gas into the gallery. It will be understood that when the emergency stop switch 14 is operated, the gas is prevented from flowing through the pipe 1 but the mechanism is not reset. The operation of stop button 14 deenergizes holding coil 47 of relay 40 and opens holding contacts 44. If the emergency stop switch 14 is released and contacts 12 are closed, the device will proceed in allowing the additional required amount of gas to flow into the gallery.

If it is desired to reset the rotary switches 20 and 30 to their zero position at any time, such as after the stop switch has been operated, the normally open reset switch 15 is operated. This applies an energizing potential from the direct current source directly to the separate coil 55 of the relay 50, closing contacts 51 to 54, and initiating the reset operation.

It will be seen that rotary switches 20 and 30 are not necessarily reset to their zero position synchronously and it is entirely possible that one of the switches will reach its zero position while the other is still being stepped toward it. For this reason, to insure that each switch returns to its zero position, it is necessary to provide separate homing contacts 29 and 39, separate contact banks 21 and 31, and separate relay contacts 52 and 54. It is also necessary to provide separate pulsing contact banks 23 and 33 to maintain relay 50 in a closed condition until both switches are in their zero positions.

When arm 26 arrives at the predetermined contact point and the relay 50 operates, positive voltage is made available for energizing coils 55, 27 and 37 both by the contact banks 25—35 and by the contact banks 23—33. Thereafter, the contactor arms 26—36 not necessarily being in synchronism, the positive voltage is obtained from contact banks 23—33.

It will be understood that the device herein described is exemplary only and that many modifications and changes could be made therein without the exercise of invention by those skilled in the art within the scope of the appended claims.

What is claimed is:

1. A rotary counting switch and a rotary preset switch each having a first, second and third banks of contacts and a corresponding first, second and third rotating contactor arms, the three contactor arms of each switch rotating in fixed mutual angular relation, means for rotating the three contactor arms of the counting switch one step for each energized pulse supplied thereto, means for rotating the three contactor arms of the said preset switch a predetermined number of steps, connections between corresponding contacts of the first contact banks of the counting and preset switches, means operating when the contactor arms of the counting and preset switches rest on corresponding contacts, a slow-to-open relay energized to closed position when said first contactor arms contact connected contacts, a connection through the second contactor arms and the contacts corresponding to the second contact banks representing integral units to supply potential to energize said slow-to-open relay, and homing means connected through said third contactor arms and the contacts of said third contact banks representing integral units to reset both of said rotary switches to zero.

2. A rotary counting switch and a rotary preset switch, each having a bank of contacts and a rotating contactor, means for rotating the contactor arm of the counting switch one step for each energizing pulse supplied thereto, means for rotating the contactor arm of said preset rotary switch a predetermined number of steps, connections between corresponding contacts of the counting and preset switches, means including a relay means operated when the contactor arms of the counting and preset switches rest on corresponding contacts, a separate homing means for each of said counting and preset switches conditioned for operation by said relay means to step said counting and said preset switches to their positions indicative of zero units, and means operated by said stepping means to keep said relay in an operated position until said counting and preset switches are in their positions indicative of zero units.

ROBERT S. JAMES.

REFERENCES CITED

The following references are of record in the file of this patent:

UNITED STATES PATENTS

| Number | Name | Date |
|---|---|---|
| 1,200,811 | Clement | Oct. 10, 1916 |
| 1,888,533 | Jauch | Nov. 22, 1932 |
| 1,977,781 | Staegemann | Oct. 23, 1934 |
| 2,049,634 | Troutman | Aug. 4, 1936 |
| 2,087,039 | McMaster | July 13, 1937 |
| 2,136,630 | Massonneau | Nov. 15, 1938 |
| 2,346,869 | Poole | Apr. 18, 1944 |
| 2,517,559 | Haigh | Aug. 8, 1950 |